US012703658B2

(12) United States Patent
Ping et al.

(10) Patent No.: US 12,703,658 B2
(45) Date of Patent: Aug. 11, 2026

(54) LITHIUM-ZIRCONIUM-BASED ALUMINOSILICATE GLASS, REINFORCED GLASS, PREPARATION METHOD THEREFOR AND DISPLAY DEVICE

(71) Applicants: QINGYUAN CSG NEW ENERGY-SAVING MATERIALS CO., LTD, Qingyuan (CN); CSG HOLDING CO., LTD., Shenzhen (CN)

(72) Inventors: Wenliang Ping, Qingyuan (CN); Xianglei Zhou, Qingyuan (CN); Zifan Xiao, Qingyuan (CN); Yan Wang, Qingyuan (CN); Honggang Liu, Qingyuan (CN); Zhihong Chen, Qingyuan (CN)

(73) Assignees: QINGYUAN CSG NEW ENERGY-SAVING MATERIALS CO., LTD., Qingyuan (CN); CSG HOLDING CO., LTD., Shenzhen (CN)

( * ) Notice: Subject to any disclaimer, the term of this patent is extended or adjusted under 35 U.S.C. 154(b) by 1162 days.

(21) Appl. No.: 17/767,193

(22) PCT Filed: Dec. 31, 2019

(86) PCT No.: PCT/CN2019/130579
§ 371 (c)(1),
(2) Date: Apr. 7, 2022

(87) PCT Pub. No.: WO2021/068422
PCT Pub. Date: Apr. 15, 2021

(65) Prior Publication Data

US 2022/0371942 A1 Nov. 24, 2022

(30) Foreign Application Priority Data

Oct. 10, 2019 (CN) ........................ 201910965501.6

(51) Int. Cl.

| | |
|---|---|
| ***C03C 3/093*** | (2006.01) |
| ***C03C 3/095*** | (2006.01) |
| ***C03C 4/18*** | (2006.01) |
| ***C03C 21/00*** | (2006.01) |

(52) U.S. Cl.
CPC .............. *C03C 3/093* (2013.01); *C03C 3/095* (2013.01); *C03C 4/18* (2013.01); *C03C 21/002* (2013.01)

(58) Field of Classification Search
CPC ...................................................... C03C 3/093
See application file for complete search history.

(56) References Cited

U.S. PATENT DOCUMENTS

| | | | | |
|---|---|---|---|---|
| 9,499,428 | B2 | 11/2016 | Maloney et al. | |
| 10,071,933 | B2 | 9/2018 | Wang et al. | |
| 10,351,471 | B2 | 7/2019 | Meinhardt et al. | |
| 10,974,990 | B2 | 4/2021 | Da et al. | |
| 11,866,364 | B2 | 1/2024 | Hu et al. | |
| 2012/0135848 | A1 | 5/2012 | Beall et al. | |
| 2016/0347655 | A1* | 12/2016 | Meinhardt | C03C 4/18 |
| 2020/0102245 | A1* | 4/2020 | Da | C03C 3/097 |

FOREIGN PATENT DOCUMENTS

| | | | | |
|---|---|---|---|---|
| CN | 102167507 A | | 8/2011 | |
| CN | 102336521 A | * | 2/2012 | |
| CN | 102690059 A | | 9/2012 | |
| CN | 107074630 A | | 8/2017 | |
| CN | 107074638 A | | 8/2017 | |
| CN | 108529873 A | * | 9/2018 | C03C 21/002 |
| CN | 108623151 A | | 10/2018 | |
| CN | 108863050 A | | 11/2018 | |
| CN | 110615610 A | | 12/2019 | |
| IN | 108529873 A | | 9/2018 | |
| JP | 2013028506 A | | 2/2013 | |
| JP | 2013520388 A | | 6/2013 | |
| JP | 2016508954 A | | 3/2016 | |
| JP | 2017529304 A | | 10/2017 | |
| KR | 20140027861 A | | 3/2014 | |
| WO | 2017201681 A1 | | 11/2017 | |
| WO | 2018218690 A1 | | 12/2018 | |
| WO | 2019000942 A1 | | 1/2019 | |

OTHER PUBLICATIONS

Japanese Office Action, and English Translation therefor, for counterpart Japanese Application No. 2022-520722, mailed May 9, 2023 (10 pages).
Extended European Search Report for Counterpart European Application No. 19948358.7, mailed Nov. 2, 2023. (8 pages).
Korean Office Action for Counterpart Korean Application No. 10-2022-7013213, mailed Nov. 28, 2023. (6 pages).
International Search Report and Written Opinion, and English Translation thereof, for International Application No. PCT/CN2019/130579, mailed Jul. 6, 2020 (14 pages).
2 Chinese Office Action for counterpart Chinese Application No. 201910965501.6, mailed Apr. 23, 2020 (8 pages).

* cited by examiner

*Primary Examiner* — Elizabeth A. Bolden
(74) *Attorney, Agent, or Firm* — Kagan Binder, PLLC

(57) ABSTRACT

Disclosed is a lithium zirconium-based aluminosilicate glass, comprising the following components by mass percentage: 50%-72% of $SiO_2$, 10%-27% of $Al_2O_3$, 0.1%-10.0% of $B_2O_3$, 2%-10% of $Li_2O$, 4%-15% of $Na_2O$, 0.1%-5.0% of $ZrO_2$, and 0-4% of $K_2O$, wherein the total mass percentage of $Li_2O$, $Na_2O$ and $K_2O$ is ≥9%, and the ratio of the mass of $Li_2O$ to the total mass of $Li_2O$, $Na_2O$ and $K_2O$ is (0.22-0.48):1.

17 Claims, 2 Drawing Sheets

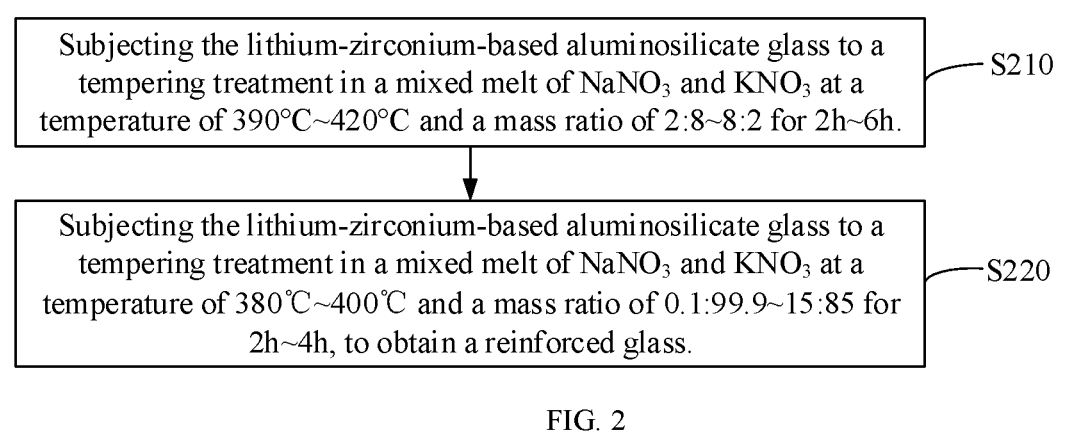

Subjecting the lithium-zirconium-based aluminosilicate glass to a tempering treatment in a mixed melt of $NaNO_3$ and $KNO_3$ at a temperature of 390°C~420°C and a mass ratio of 2:8~8:2 for 2h~6h. — S210

↓

Subjecting the lithium-zirconium-based aluminosilicate glass to a tempering treatment in a mixed melt of $NaNO_3$ and $KNO_3$ at a temperature of 380℃~400℃ and a mass ratio of 0.1:99.9~15:85 for 2h~4h, to obtain a reinforced glass. — S220

FIG. 2

LITHIUM-ZIRCONIUM-BASED ALUMINOSILICATE GLASS, REINFORCED GLASS, PREPARATION METHOD THEREFOR AND DISPLAY DEVICE

CROSS REFERENCE TO RELATED APPLICATIONS

This application is a national stage for International Application PCT/CN2019/130579, filed on Dec. 31, 2019, and entitled "LITHIUM-ZIRCONIUM- BASED ALUMINOSILICATE GLASS, REINFORCED GLASS, PREPARATION METHOD THEREFOR AND DISPLAY DEVICE," which claims priority to Chinese Patent Application No. 201910965501.6, filed on Oct. 10, 2019. The entireties of both applications are incorporated by reference herein for all purposes.

TECHNICAL FIELD

The present disclosure relates to the field of glass, in particular to a lithium-zirconium-based aluminosilicate glass, a reinforced glass, a preparation method therefor, and a display device.

BACKGROUND

Thin-plate glass is a component used to protect a display panel of a display device without affecting its display effect. There are many display devices, such as portable phones, personal digital assistants (PDAs), digital cameras, flat panel displays (FPDs), and other display devices. In recent years, as display devices such as portable phones and PDAs tend to be thinner and more functional, higher requirements have been placed on the mechanical strength of glass. Therefore, generally, the thin-plate glass may be further chemically reinforced to obtain tempered glass. The tempered glass can be chemically reinforced by ion exchange treatment, so as to allow sodium and lithium ions on the glass surface to be exchanged with potassium or sodium ions in the ion exchange salt to form a compressive stress layer on the glass surface.

In conventional glass cover plate market, there are mainly (boron) aluminosilicate glass and lithium (boron) aluminosilicate glass, such as Gorilla glass of Corning, T2X-1 of NEG, Dragontrail glass of Asahi Glass, and Panda Glass of domestic Xuhong, and KK3 glass of South Glass, etc. However, the strength of the conventional glass is still low, and it cannot play a very good protective role when used to protective glass for mobile devices.

SUMMARY

In view of above, it is necessary to provide a lithium-zirconium-based aluminosilicate glass with higher strength.

In addition, a reinforced glass, a method for preparing the reinforced glass, and a display device are also provided.

A lithium-zirconium-based aluminosilicate glass includes the following components by mass percentage:

50%~72% of $SiO_2$;
10%~27% of $Al_2O_3$;
0.1%~10.0% of $B_2O_3$;
2%~10% of $Li_2O$;
4%~15% of $Na_2O$;
0.1%~5.0% of $ZrO_2$; and
0~4% of $K_2O$, wherein a total mass percentage of $Li_2O$, $Na_2O$, and $K_2O$ is no less than 9%, and a ratio of a mass of $Li_2O$ to a total mass of $Li_2O$, $Na_2O$, and $K_2O$ is (0.22~0.48):1.

A reinforced glass is obtained from the above-mentioned lithium-zirconium-based aluminosilicate glass by chemical reinforcement.

A method for preparing the reinforced glass includes steps of: subjecting the above-mentioned lithium-zirconium-based aluminosilicate glass to a tempering treatment in a mixed melt of $NaNO_3$ and $KNO_3$ at a temperature of 390° C.~420° C. and a mass ratio of 2:8~8:2 for 2 h~6 h, and then subjecting the above-mentioned lithium-zirconium-based aluminosilicate to a tempering treatment in a mixed melt of $NaNO_3$ and $KNO_3$ at a temperature of 380° C.~400° C. and a mass ratio of 0.1:99.9~15:85 for 2 h~4 h to obtain the reinforced glass.

A display device includes the above-mentioned lithium-zirconium-based aluminosilicate glass or the above-mentioned reinforced glass or the reinforced glass prepared by the above-mentioned method for preparing the reinforced glass.

The details of one or more embodiments of the present disclosure are set forth in the accompanying drawings and the description below. Other features, objects and advantages of the present disclosure will become apparent from the description, the accompanying drawings, and the claims.

BRIEF DESCRIPTION OF THE DRAWINGS

FIG. 2 is a process flow chart of a method for preparing a reinforced glass according to an embodiment.

DETAILED DESCRIPTION OF THE EMBODIMENTS

Figure 1:
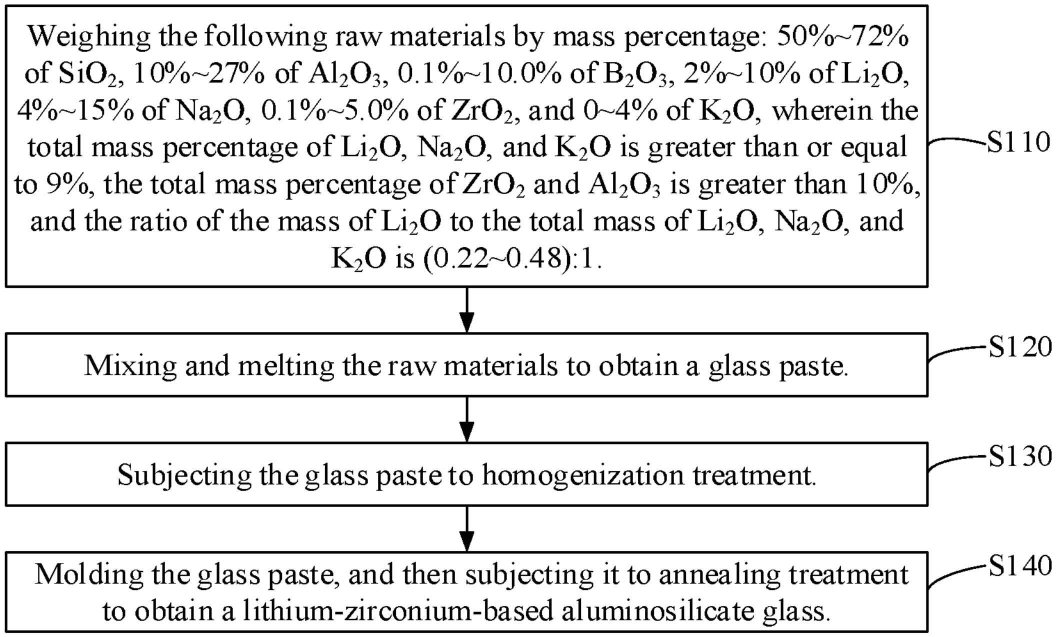
FIG. 1 is a process flow chart of a method for preparing a lithium-zirconium-based aluminosilicate glass according to an embodiment.

In order to facilitate the understanding of the present disclosure, the present disclosure will be more fully described below with reference to specific embodiments. Preferable embodiments of the present disclosure are set forth in the specific embodiments. However, the present disclosure may be implemented in many different forms and is not limited to the examples described herein. Rather, these examples are provided for the purpose of giving a more thorough understanding of the present disclosure.

All technical and scientific terms used herein have the same meaning as commonly understood by skilled person in the art to which this disclosure belongs, unless otherwise defined.

The terms used in the specification of the present disclosure herein are for the purpose of describing specific embodiments only and are not intended to limit the present disclosure.

A lithium-zirconium-based aluminosilicate glass according to an embodiment includes the following components by mass percentage:

50%~72% of $SiO_2$;
10%~27% of $Al_2O_3$;
0.1%~10.0% of $B_2O_3$;
2%~10% of $Li_2O$;
4%~15% of $Na_2O$;
0.1%~5.0% of $ZrO_2$; and
0~4% of $K_2O$, wherein the total mass percentage of $Li_2O$, $Na_2O$, and $K_2O$ is no less than 9%, the total mass percentage of $ZrO_2$ and $Al_2O_3$ is greater than 10%, and a ratio of the mass of $Li_2O$ to the total mass of $Li_2O$, $Na_2O$, and $K_2O$ is (0.22~0.48):1.

In an embodiment, the lithium-zirconium-based aluminosilicate glass further includes at least one of MgO, CaO, SrO, ZnO, and $TiO_2$. Specifically, MgO has a mass percentage of no greater than 6%, CaO has a mass percentage of no greater than 4%, SrO has a mass percentage of no greater than 4%, ZnO has a mass percentage of no greater than 4%, and $TiO_2$ has a mass percentage of no greater than 2%.

Further, MgO has a mass percentage of no greater than 4%, CaO has a mass percentage of no greater than 2%, SrO has a mass percentage of no greater than 2%, ZnO has a mass percentage of no greater than 2%, and $TiO_2$ has a mass percentage of no greater than 1%.

Furthermore, the lithium-zirconium-based aluminosilicate glass further includes at least one of MgO, ZnO, and $TiO_2$, wherein MgO has a mass percentage of no greater than 2%, ZnO has a mass percentage of no greater than 2%, and $TiO_2$ has a mass percentage of no greater than 1%.

In an embodiment, the lithium-zirconium-based aluminosilicate glass further includes no greater than 1% of $SnO_2$ by mass percentage. Furthermore, $SnO_2$ has a mass percentage of no greater than 0.5%.

In another embodiment, the lithium-zirconium-based aluminosilicate glass further includes no greater than 0.5% of $CeO_2$ by mass percentage.

More preferably, the lithium-zirconium-based aluminosilicate glass includes: 50%~72% of $SiO_2$, 10%~27% of $Al_2O_3$, 0.1%~10.0% of $B_2O_3$, 2%~10% of $Li_2O$, 4%~15% of $Na_2O$, 0.1%~5.0% of $ZrO_2$, 0~4% of $K_2O$, MgO with a mass percentage of no greater than 4%, ZnO with a mass percentage of no greater than 2%, $TiO_2$ with a mass percentage of no greater than 1%, $SnO_2$ with a mass percentage of no greater than 1%, and $CeO_2$ with a mass percentage of no greater than 0.5%. The total mass percentage of $Li_2O$, $Na_2O$, and $K_2O$ is no less than 9%, and the ratio of the mass of $Li_2O$ to the total mass of $Li_2O$, $Na_2O$, and $K_2O$ is (0.22~0.48):1.

It should be noted that in this embodiment, $P_2O_5$ and $Fe_2O_3$ are not contained in the lithium-zirconium-based aluminosilicate glass. Without adding $P_2O_5$ to the lithium-zirconium-based aluminosilicate glass, the P-B phase separation opacification caused by the addition of $P_2O_5$ and $B_2O_3$ can be avoided, so as to avoid the increase in haze (i.e., opacity) and the reduction of the chemical stability of the glass.

$SiO_2$ (silicon dioxide) is an important glass-forming oxide and an essential component to form a glass skeleton. $SiO_2$ can improve the strength and chemical stability of the glass, and can make the glass obtain a higher strain point and a lower coefficient of thermal expansion. In this embodiment, $SiO_2$ preferably has a mass percentage of 50%~72%, more preferably, a mass percentage of 55%~67%, and most preferably, a mass percentage of 58%~64%. If $SiO_2$ has a mass percentage of less than 50%, the main body network structure, the mechanical properties, and the weather resistance of the glass will become poor. If $SiO_2$ has a mass percentage of greater than 72%, the melting temperature of the glass during the production process will be too high, the energy consumption will increase, and it will be easy to cause defects such as frequent bubbles and stones. In addition, the proportion of silica skeleton structure will be too high, and the network gap will be small, which will be not conducive to chemical reinforcement of ion exchange, thereby affecting the efficiency of chemical enhancement. Therefore, in this embodiment, $SiO_2$ is set to have a mass percentage of 50%~72%.

$Al_2O_3$ (aluminium sesquioxide) can participate in the formation of the network and act as a network generator, and can reduce the crystallization tendency of the glass, improve the chemical stability, thermal stability, mechanical strength, and hardness of the glass. In addition, $Al_2O_3$ is also an essential component to increase the elastic modulus of stretched glass. However, the addition of $Al_2O_3$ will increase the viscosity of the glass. If the mass percentage of $Al_2O_3$ is too high, it will be difficult to obtain glass with long material properties, making it difficult to mold the glass. Besides, $Al^{3+}$ in the glass tends to form an aluminum-oxygen tetrahedral network [$AlO_4$], which is much larger than the silicon-oxygen tetrahedral [$SiO_4$] network, leaving larger voids as channels for ion diffusion. As a result, the high content of $Al_2O_3$ in the glass can promote the migration and replacement rate of alkali metal ions. The higher the content of $Al_2O_3$, the larger the gap in the skeleton network, which is more conducive to ion exchange. However, the coefficient of thermal expansion will not be further reduced due to its high content. On the contrary, the high temperature viscosity of the glass will increase significantly and the melting temperature during the production process will be too high and the energy consumption will increase, which is also not conducive to the control of defects such as bubbles and stones. However, if the content of $Al_2O_3$ is low, the voids in the network space will become smaller, which is not conducive to ion migration and seriously affects the efficiency of chemical enhancement. Therefore, in this embodiment, $Al_2O_3$ preferably has a mass percentage of 10%~27%, more preferably, a mass percentage of 13%~25%, and most preferably, a mass percentage of 16%~22%.

$B_2O_3$ (boron oxide) is one of the important components of boro-aluminosilicate glass and belongs to a glass former oxide, which can reduce the coefficient of thermal expansion of the aluminosilicate glass and improve the thermal and chemical stabilities of the aluminosilicate glass. If the content of $B_2O_3$ is too high, it will cause serious boron volatilization at high temperature due to its effect of reducing viscosity. In addition, the forming temperature will be narrowed due to the too high content of $B_2O_3$, which will make it difficult to control the wall thickness and pipe diameter accuracy in the forming of boro-aluminosilicate glass. In addition, when the amount of $B_2O_3$ introduced is too high, the expansion coefficient of boro-aluminosilicate glass will increase due to the increase of boron-oxygen triangle [$BO_3$], and an abnormal phenomenon will occur. When the content of $B_2O_3$ is too high, the ion exchange capacity of the glass will be significantly reduced. Therefore, in this embodiment, $B_2O_3$ preferably has a mass percentage of 0.1%~10.0%, more preferably, a mass percentage of 0.5%~4.0%, and most preferably, a mass percentage of 1%~2%.

$Li_2O$ (lithium oxide) is an ideal flux and is the main component for ion exchange. Due to the polarization characteristics of $Li^+$, $Li_2O$ can effectively reduce high-temperature viscosity at high temperature, and since $Li^+$ has a small radius, $Li_2O$ can be filled in the glass body air to balance free oxygen. Thus, a proper amount of $Li_2O$ can significantly enhance the mechanical strength, surface hardness, and chemical resistance of the glass body. Since in this embodiment, the mixed molten salt of $NaNO_3$ and $KNO_3$ is used in the reinforcement process, the depth of the compressive stress layer can be increased in a short time due to the exchange of the $Li^+$ in the glass and the $Na^+$ in the molten salt, making the glass have more excellent mechanical impact resistance. Preferably, $Li_2O$ has a mass percentage of 2%~10%. More preferably, $Li_2O$ has a mass percentage of 3%~7%. Most preferably, $Li_2O$ has a mass percentage of 4%~6%. If the mass percentage of $Li_2O$ is less than 2%, it will become basically difficult for the glass to obtain a higher stress layer depth; if it is higher than 10%, the manufacturing cost of the glass will increase, the expansion coefficient of the glass will significantly increase, and the crystallization tendency of the glass will be so high that the probability of stone defects in glass will significantly increase.

$Na_2O$ (sodium oxide) is a network outer body oxide of the boro-aluminosilicate glass, which can provide free oxygen to break the Si—O bond, thereby reducing the viscosity and melting temperature of the aluminosilicate glass. Too high content of $Na_2O$ may increase the coefficient of linear thermal expansion, reduce chemical stability, and increase the amount of $Na_2O$ volatilization, resulting in uneven composition of the aluminosilicate glass. Too low content of $Na_2O$ may be not conducive to the melting and molding of glass, and it is not conducive to the chemical exchange of Na ions and K ions to form a compressive stress layer on the surface of the glass to enhance the mechanical strength of the glass. In this embodiment, the $Na_2O$ component takes on the role of exchanging with K ions in the melt to form the compressive stress on the glass surface during tempering, which directly affects the strength performance of the glass. Therefore, in this embodiment, $Na_2O$ preferably has a mass percentage of 4%~15%, more preferably, a mass percentage of 6%~12%, and most preferably, a mass percentage of 8%~10%.

$K_2O$ (potassium oxide) and $Na_2O$ are both alkali metal oxides, and have similar functions in the glass structure. Substituting $Na_2O$ by a small amount of $K_2O$ can exert a "mixed alkali effect" and make a series of properties of the glass better. $K_2O$ is a component used to improve melting properties and to increase ion exchange rate in chemical reinforcement to obtain the required surface compressive stress and stress layer depth. If the content of $K_2O$ is too high, the weather resistance will decrease. In this embodiment, according to the inventor's analysis of the alkali metal content in the glass, $K_2O$ is set to have a mass percentage of 0~4%, more preferably, a mass percentage of 0~3%, and most preferably, a mass percentage of 0~2%.

$ZrO_2$ is mainly in a form of cubic $[ZrO_8]$ coordination in silicate glass. Due to its large ionic radius, it belongs to a network outer body in the glass structure, and it has small solubility in the glass, which will significantly increase the viscosity of the glass. Therefore, the addition amount of $ZrO_2$ should not exceed 5%. $ZrO_2$ can improve the acid and alkali resistance and refractive index of the glass. In this embodiment, $ZrO_2$ preferably has a mass percentage of 0.1%~5.0%, more preferably, a mass percentage of 1%~4%, and most preferably, a mass percentage of 3%~4%.

MgO (magnesium oxide) is a network outer body oxide, and helps to reduce the melting point of glass. It can reduce the viscosity of glass at high temperature, promote the melting and clarification of glass, improve uniformity, and increase hydrolysis resistance. MgO can also stabilize the glass, improve the durability of the glass, prevent crystallization of the glass, inhibit the movement of alkali metal ions in the glass, and also has the function of improving the elastic modulus of the glass. MgO can enhance the stability of the network space of the glass at low temperature, and can reduce the coefficient of thermal expansion of the glass to a certain extent, but it has a hindering effect on ion exchange. Therefore, in this embodiment, MgO is not an essential component and may be omitted. In this embodiment, MgO preferably has a mass percentage of 0~6%, more preferably, a mass percentage of 0~4%, and most preferably, a mass percentage of 0~2%. If the mass percentage of MgO is higher than 6%, $Mg^{2+}$ will seriously hinder the ion exchange capacity of the glass, resulting in a significant reduction in the depth of the compressive stress layer.

CaO (calcium oxide) may result in relaxation and break of the network formed by silicon-oxygen tetrahedron $[SiO_4]$, and improve the melting properties of glass at high temperatures or make the glass less prone to devitrification. However, too much content will affect the weather resistance of the aluminosilicate glass, and seriously hinder the progress of ion exchange. In this embodiment, CaO is an unnecessary component and may be omitted. Preferably, CaO has a mass percentage of 0~4%. More preferably, CaO has a mass percentage of 0~2%.

SrO (strontium oxide) is similar to calcium oxide and magnesium oxide, all of which can reduce the high temperature viscosity of the glass and facilitate melting, but due to its large ionic radius, SrO will not hinder the exchange process of Li—Na—K ions in the glass structure. Therefore, a small amount of strontium oxide is used to replace part of calcium oxide and magnesium oxide. In this embodiment, SrO preferably has a mass percentage of 0~4%, and more preferably, a mass percentage of 0~2%. In this embodiment, SrO may also be omitted.

ZnO (zinc oxide) belongs to divalent metal oxides, and also has the function of alkaline earth metal oxides. In the silicate glass system, adding part of ZnO materials can effectively reduce the melting temperature of the glass and lower the glass transition temperature $T_g$, and can also improve the alkali resistance of the glass substrate at the same time. In the aluminosilicate glass body, Zn often exists in the two ligands $[ZnO_6]$ and $[ZnO_4]$. $[ZnO_4]$ increases with the increase of alkali content, which increases the crystallization tendency of glass. In the present disclosure, a part of zinc oxide is used to replace calcium oxide and magnesium oxide, which is beneficial to maintain the chemical stability of the glass while promoting the rapid progress of ion exchange. Preferably, ZnO has a mass percentage of 0~4%. More preferably, ZnO has a mass percentage of 0~2%. In this embodiment, ZnO may also be omitted.

$TiO_2$ has a function similar to $ZrO_2$, and it is a transitional element, which has a certain coloring ability and shows yellow, and can improve the chemical stability of the glass and increase the color temperature of the glass. Therefore, in this embodiment, $TiO_2$ preferably has a mass percentage of 0~2%, and more preferably, a mass percentage of 0~1%. In this embodiment, $TiO_2$ is not an essential component and may be omitted.

$SnO_2$ and $CeO_2$ often exist in multiple valence states in the glass body, which can increase the UV resistance of the glass and prevent the color change due to the valence change of coloring ions. Moreover, when added alone or in combination, $SnO_2$ and $CeO_2$ can also increase the high-temperature defoaming ability of the glass body, which are commonly used clarifying agents. In this embodiment, $SnO_2$ preferably has a mass percentage of 0~1%, and more preferably a mass percentage of 0~0.5%, and $CeO_2$ preferably has amass percentage of 0~0.5%. In this embodiment, neither $SnO_2$ nor $CeO_2$ is an essential component, and may be omitted.

Setting the total mass percentage of $Li_2O$, $Na_2O$, and $K_2O$ to be greater than or equal to 9% has the following effects. Alkali metals, as a typical glass network modifier, can significantly reduce the melting temperature of glass. Further, in the present disclosure, alkali metal ions are the key to whether the glass can be chemically reinforced to achieve ion exchange so as to obtain a sufficient compressive stress layer on the glass surface. After comprehensive consideration, the total mass percentage of $Li_2O$, $Na_2O$, and $K_2O$ should be greater than or equal to 9%.

Setting the ratio of the mass of $Li_2O$ to the total mass of $Li_2O$, $Na_2O$, and $K_2O$ to be (0.22~0.48):1 has the following effects. In the present disclosure, alkali metals are the key to whether the glass can achieve high-performance chemical reinforcement, and also play different roles during the chemical reinforcement process. A certain proportion of Li is required in the glass body to be exchanged with Na ions and part of K ions in the tempering salt during the first step of chemical tempering. Due to the difference in ion volume, a compressive stress layer with a stress gradient is formed on the surface of the glass, and the depth of the stress layer is relatively deep, the strength and toughness of the glass can be increased. After long-term tests, $Li_2O$ accounts for more than 22% of the total alkali metal content, and should not exceed 48%. In addition to the impacts of the ratio of $Li_2O$ to the total alkali metals on the tempering performance, due to the small relative molecular mass of $Li_2O$, under same mass percentage, $Li_2O$ has more moles than $Na_2O$ and $K_2O$, it may drastically reduce the melting temperature of the glass, which is not conducive to the production control, and too much $Li_2O$ will cause glass crystallization. Thus, the proportion of $Li_2O$ in alkali metals should not exceed 48%.

Setting the total mass percentage of $ZrO_2$ and $Al_2O_3$ to be greater than 10% has the following effects. In the present disclosure, $ZrO_2$ and $Al_2O_3$ are the key components to realize the speed and difficulty of alkali metal ion exchange during the chemical tempering process, which are used as network intermediates and partially participate in the glass network structure. The macromolecular $ZrO_2$ is filled in the gaps of the network to form loose structural channels for alkali metal ion exchange, which is conducive to ion exchange in the depth direction of the glass, thereby forming high stress depth and high surface stress. In addition, $ZrO_2$ and $Al_2O_3$ components can increase the chemical stability of the glass, so their total mass percentage should be greater than 10%.

In some embodiments, preferably, the lithium-zirconium-based aluminosilicate glass includes, by mass percentage: 55%~67% of $SiO_2$, 13%~25% of $Al_2O_3$, 0.5%~4% of $B_2O_3$, 3%~7% of $Li_2O$, 6%~12% of $Na_2O$, 1%~4% of $ZrO_2$, and 0~3% of $K_2O$. The total mass percentage of $Li_2O$, $Na_2O$, and $K_2O$ is greater than or equal to 9%, the total mass percentage of $ZrO_2$ and $Al_2O_3$ is greater than 16%, and the ratio of the mass of $Li_2O$ to the total mass of $Li_2O$, $Na_2O$, and $K_2O$ is (0.27~0.41):1.

In these embodiments, the lithium-zirconium-based aluminosilicate glass may further include at least one of MgO, CaO, SrO, ZnO, and $TiO_2$. Specifically, MgO has a mass percentage of no greater than 6%, CaO has a mass percentage of no greater than 4%, SrO has a mass percentage of no greater than 4%, ZnO has a mass percentage of no greater than 4%, and $TiO_2$ has a mass percentage of no greater than 2%.

Furthermore, MgO has a mass percentage of no greater than 4%, CaO has a mass percentage of no greater than 2%, SrO has a mass percentage of no greater than 2%, ZnO has a mass percentage of no greater than 2%, and $TiO_2$ has a mass percentage of no greater than 1%.

In these embodiments, the lithium-zirconium-based aluminosilicate glass may further include at least one of $SnO_2$ and $CeO_2$. $SnO_2$ has a mass percentage of no greater than 1%. Furthermore, $SnO_2$ has a mass percentage of no greater than 0.5%. $CeO_2$ has a mass percentage of no greater than 0.5%.

More preferably, in these embodiments, the lithium-zirconium-based aluminosilicate glass includes: 55%~67% of $SiO_2$, 13%~25% of $Al_2O_3$, 0.5%~4% of $B_2O_3$, 3%~7% of $Li_2O$, 6%~12% of $Na_2O$, 1%~4% of $ZrO_2$, 0~3% of $K_2O$, MgO with a mass percentage of no greater than 4%, ZnO with a mass percentage of no greater than 2%, $TiO_2$ with a mass percentage of no greater than 1%, $SnO_2$ with a mass percentage of no greater than 1%, and $CeO_2$ with a mass percentage of no greater than 0.5%. The total mass percentage of $Li_2O$, $Na_2O$, and $K_2O$ is greater than or equal to 9%, the total mass percentage of $ZrO_2$ and $Al_2O_3$ is greater than 16%, and the ratio of the mass of $Li_2O$ to the total mass of $Li_2O$, $Na_2O$, and $K_2O$ is (0.27~0.41):1.

It should be noted that in this embodiment, MgO, CaO, SrO, ZnO, $TiO_2$, $SnO_2$, and $CeO_2$ may also be omitted.

In other embodiments, more preferably, the lithium-zirconium-based aluminosilicate glass includes, by mass percentage: 58%~64% of $SiO_2$, 16%~22% of $Al_2O_3$, 1%~2% of $B_2O_3$, 4%~6% of $Li_2O$, 8%~10% of $Na_2O$, 3%~4% of $ZrO_2$, and 0~2% of $K_2O$. The total mass percentage of $Li_2O$, $Na_2O$, and $K_2O$ is greater than or equal to 12%, the total mass percentage of $ZrO_2$ and $Al_2O_3$ is greater than 19.5%, and the ratio of the mass of $Li_2O$ to the total mass of $Li_2O$, $Na_2O$, and $K_2O$ is (0.29~0.38):1.

In these embodiments, the lithium-zirconium-based aluminosilicate glass may further include by mass percentage at least one of MgO, CaO, SrO, ZnO, and $TiO_2$. Specifically, MgO has a mass percentage of no greater than 6%, CaO has a mass percentage of no greater than 4%, SrO has a mass percentage of no greater than 4%, ZnO has a mass percentage of no greater than 4%, and $TiO_2$ has a mass percentage of no greater than 2%.

Furthermore, MgO has a mass percentage of no greater than 4%, CaO has a mass percentage of no greater than 2%, SrO has a mass percentage of no greater than 2%, ZnO has a mass percentage of no greater than 2%, and $TiO_2$ has a mass percentage of no greater than 1%.

Furthermore, in these embodiments, the lithium-zirconium-based aluminosilicate glass may further include at least one of $SnO_2$ and $CeO_2$. $SnO_2$ has a mass percentage of no greater than 0.5%. $CeO_2$ has a mass percentage of no greater than 0.5%.

More preferably, in these embodiments, the lithium-zirconium-based aluminosilicate glass includes: 58%~64% of $SiO_2$, 16%~22% of $Al_2O_3$, 1%~2% of $B_2O_3$, 4%~6% of $Li_2O$, 8%~10% of $Na_2O$, 3%~4% of $ZrO_2$, 0~2% of $K_2O$, MgO with a mass percentage of no greater than 4%, ZnO with a mass percentage of no greater than 2%, $TiO_2$ with a mass percentage of no greater than 1%, $SnO_2$ with a mass percentage of no greater than 1%, and $CeO_2$ with a mass percentage of no greater than 0.5%. The total mass percentage of $Li_2O$, $Na_2O$, and $K_2O$ is greater than or equal to 12%, the total mass percentage of $ZrO_2$ and $Al_2O_3$ is greater than 19.5%, and the ratio of the mass of $Li_2O$ to the total mass of $Li_2O$, $Na_2O$, and $K_2O$ is (0.29~0.38):1.

It should be noted that in this embodiment, MgO, ZnO, $TiO_2$, $SnO_2$, and $CeO_2$ may also be omitted.

A conventional technology discloses a glass composition including non-zero amount and less than 1 mol % of $P_2O_5$ and $K_2O$, and a ratio of $Li_2O$ to a total amount of $B_2O_3$, $P_2O_5$, $SiO_2$, and $Al_2O_3$ being less than 0.074. In contrast, since the lithium-zirconium-based aluminosilicate glass according to an embodiment of the present disclosure does not include $P_2O_5$, the P-B phase separation opacification caused by the addition of $P_2O_5$ and $B_2O_3$ can be avoided, so as to avoid the increase in haze (i.e., opacity). And $P_2O_5$ in the glass will reduce the chemical stability of the glass, especially due to the corrosion of the glass by water vapor and acidic liquids. Moreover, in the embodiments of the present disclosure, the ratio of $Li_2O$ to the total molar amount of $B_2O_3$, $P_2O_5$, $SiO_2$, and $Al_2O_3$ is generally higher than 0.074, and the amount of $Li_2O$ is also generally higher than that of $Na_2O$, which can give full play to the advantage of the exchange of Li ions in the glass body with Na and K ions in the tempered salt. As a result, the lithium-zirconium-based aluminosilicate glass in this embodiment has a surface stress value of greater than 800 MPa, and a depth of greater than 130 μm, i.e., the bending strength of the glass and the energy limit to withstand impact are greatly increased.

Another technology discloses a thin lithium-aluminum-silicon glass having a central tension after tempering of less than 50 Mpa, a surface compressive stress of 600 Mpa~1200 Mpa, and a bending strength up to 500 MPa. Thus, the depth of the stress layer of this glass should be less than 50 μm. In contrast, after reinforced, the lithium-zirconium-based aluminosilicate glass in this embodiment may has a depth of the stress layer greater than 100 μm, which is much larger than the depth of the stress layer of the tempered glass in the above technology.

In another conventional technology, the contents of $B_2O_3$ and $ZrO_2$ are both low, while the contents of $B_2O_3$ and $ZrO_2$ in this embodiment are both greater than 0.1%. If they participate in the formation of the skeleton of the glass body structure, it will be beneficial to the later processing of the glass substrate, and increase the fracture toughness of the glass. After tempering, it forms a surface stress value of greater than 800 MPa and a compressive stress value still being greater than 55 MPa at a depth of 100 μm, so that the mechanical strength and drop resistance of the glass are enhanced.

Therefore, the conventional glass cover plate can be quickly chemically tempered, and a compressive stress layer greater than 600 MPa is formed on the glass surface, and the depth of the stress layer is generally higher than 35 μm. In contrast, for the lithium-aluminum-silicon glass treated by a special tempering process, the depth of the stress layer can reach more than 100 μm, so as to increase the glass's mechanical strength, impact resistance, friction resistance, resistance to sand and drop resistance, etc. However, the strength of conventional glass is still low.

The above-mentioned lithium-zirconium-based aluminosilicate glass has at least the following advantages.

(1) The above-mentioned lithium-zirconium-based aluminosilicate glass has a coefficient of thermal expansion of $84.5\times10^{-7}$~$94.9\times10^{-7}$ at 20° C.~300° C., a melting temperature $T_2$ of 1543° C.~1638° C., and a glass transition temperature $T_g$ of 497° C.~ 586° C. After subjected to a special chemical tempering process, the glass has a surface compressive stress CS0 greater than 800 MPa, a compressive stress CS10 of still more than 230 MPa at a depth of 10 μm from the glass surface, a compressive stress CS30 of more than 140 MPa at a depth of 30 μm from the surface, and a maximum depth of stress layer Dol0 produced by ion exchange greater than 136 μm.

(2) After reinforced, the above-mentioned lithium-zirconium-based aluminosilicate glass has a bending strength greater than 700 MPa, and can withstand a falling ball with energy greater than 0.4 J, which can be used as protective glass for mobile phones, tablets or other mobile smart devices.

Referring to FIG. 1, a method for preparing a lithium-zirconium-based aluminosilicate glass according to an embodiment is the method for preparing the above-mentioned lithium-zirconium-based aluminosilicate glass, which specifically includes the following steps.

At step S110, the following raw materials are weighed by mass percentage: 50%~72% of $SiO_2$, 10%~27% of $Al_2O_3$, 0.1%~10.0% of $B_2O_3$, 2%~10% of $Li_2O$, 4%~15% of $Na_2O$, 0.1%~5.0% of $ZrO_2$, and 0~4% of $K_2O$, wherein the total mass percentage of $Li_2O$, $Na_2O$, and $K_2O$ is greater than or equal to 9%, the total mass percentage of $ZrO_2$ and $Al_2O_3$ is greater than 10%, and the ratio of the mass of $Li_2O$ to the total mass of $Li_2O$, $Na_2O$, and $K_2O$ is (0.22~0.48):1.

At step S120, the above-mentioned raw materials are mixed and melted to obtain a glass paste.

In an embodiment, the melting in step S120 is carried out at a temperature of 1650° C. for 8 h.

At step S130, the glass paste is subjected to homogenization treatment.

In an embodiment, the homogenization treatment in step S130 is carried out at a temperature of 1500° C. for 1 h.

At step S140, the glass paste is molded, and then subjected to annealing treatment to obtain the lithium-zirconium-based aluminosilicate glass.

Specifically, in the step of molding the glass paste, a casting molding method is adopted. In an embodiment, the homogenized glass paste is casted onto an iron mold preheated at 450° C. so as to cure and mold the glass paste.

It should be noted that in the above-mentioned method for preparing lithium-zirconium-based aluminosilicate glass, the glass can be obtained through a conventional flat glass manufacturing process, and the manufacturing method is not limited to float forming process, the overflow down-draw method, Czochralski method, flat-draw method, calendering process, etc.

A reinforced glass according to an embodiment is obtained from the lithium-zirconium-based aluminosilicate glass according to the above-mentioned embodiments by chemical reinforcement. Specifically, the lithium-zirconium-based aluminosilicate glass includes by mass percentage: 50%~72% of $SiO_2$, 10%~27% of $Al_2O_3$, 0.1%~10.0% of $B_2O_3$, 2%~10% of $Li_2O$, 4%~15% of $Na_2O$, 0.1%~5.0% of $ZrO_2$, and 0~4% of $K_2O$, wherein the total mass percentage of $Li_2O$, $Na_2O$, and $K_2O$ is greater than or equal to 9%, the total mass percentage of $ZrO_2$ and $Al_2O_3$ is greater than 10%, and the ratio of the mass of $Li_2O$ to the total mass of $Li_2O$, $Na_2O$, and $K_2O$ is (0.22~0.48):1.

Referring to FIG. 2, a method for preparing a reinforced glass according to an embodiment specifically includes the following steps.

At step S210, the lithium-zirconium-based aluminosilicate glass is subjected to a tempering treatment in a mixed melt of $NaNO_3$ and $KNO_3$ at a temperature of 390° C.~420° C. and a mass ratio of 2:8~8:2 for 2 h~6 h.

Specifically, the lithium-zirconium-based aluminosilicate glass is the lithium-zirconium-based aluminosilicate glass according to the above-mentioned embodiments. Specifically, the lithium-zirconium-based aluminosilicate glass includes by mass percentage: 50%~72% of $SiO_2$, 10%~27% of $Al_2O_3$, 0.1%~10.0% of $B_2O_3$, 2%~10% of $Li_2O$, 4%~15% of $Na_2O$, 0.1%~5.0% of $ZrO_2$, and 0~4% of $K_2O$, wherein the total mass percentage of $Li_2O$, $Na_2O$, and $K_2O$ is greater than or equal to 9%, the total mass percentage of $ZrO_2$ and $Al_2O_3$ is greater than 10%, and the ratio of the mass of $Li_2O$ to the total mass of $Li_2O$, $Na_2O$, and $K_2O$ is (0.22~0.48):1.

Furthermore, the mass ratio of the mixed melt in step S210 is 6:4~4:6.

At step S220, the lithium-zirconium-based aluminosilicate glass is subjected to a tempering treatment in a mixed melt of $NaNO_3$ and $KNO_3$ at a temperature of 380° C.~400° C. and a mass ratio of 0.1:99.9~15:85 for 2 h~4 h to obtain a reinforced glass.

The lithium-zirconium-based aluminosilicate glass is reinforced by a two-step mixed salt method. The reinforcement by using two-step mixed salt method has the following effects. Through the two-step chemical tempering method, the ion species are selectively exchanged. The first step is mainly the exchange of Li ions in the glass with Na ions and K ions in the tempering salt. The Na—Li exchange will result in a compressive stress layer with a small compressive stress value and a high stress depth, which is accompanied by part of Li—K and Na—K exchange, forming a larger stress to compensate for the low stress value in the high depth direction. In the second step, the tempering salt with low temperature and high K ion content is used for tempering. The Na ions in the glass and the K ions in the tempering salt are rapidly exchanged to form a dense stress layer with lower stress depth and high compressive stress value on the glass surface, and finally a composite stress layer is formed, which is mainly characterized by having a high stress layer exceeding 700 MPa on the glass surface and a stress layer depth exceeding 100 μm or even higher in the depth direction.

The mass ratio of sodium nitrate to potassium nitrate in step S210 is set to 2:8~8:2 mainly for the purpose of achieving chemical exchange between Na ions and Li ions in the glass to form a stress layer with sufficient depth. However, since the radii of Na ions and Li ions are not much different, and there is enough space in the glass structure to meet the conversion of Na—Li ions, the depth of the formed stress layer is deep, but the stress value is low. By adding K with a large ionic radius to the tempering salt, the Li—K and Na—K exchange can be realized in the stress direction and the partial compressive stress value is increased. Therefore, the mass ratio of sodium nitrate and potassium nitrate in the first step is set to 2:8~8:2. The mass ratio of sodium nitrate to potassium nitrate in step S220 is set to 0.1:99.9~15:85 mainly for the purpose of achieving exchange between Na ions in the glass and K ions in the tempering salt to form a stress layer with a high compressive stress value on the glass surface, which forms a composite compressive stress layer with the stress layer formed by the tempering in the first step, thereby increasing the strength and toughness of the glass.

In the two-step chemical tempering process, the temperature of the mixed melt in step S210 is usually higher than the temperature of the mixed melt in step S220 by 10° C. to 20° C. Since for the two elements of the tempering process: temperature and time, with same tempering salt, the longer the treatment time and the higher the temperature, the deeper the depth of the stress layer formed, but the stress value will be significantly reduced. The purposes of the two tempering steps in the present disclosure are different. The purpose of the first step is to form a stress layer with sufficient depth (greater than 100 μm), and the higher the stress value, the better. Therefore, a higher temperature is selected in the first step, usually 390° C.~420° C., and the time is 2 h~6 h. The purpose of the second step is to form a high-stress stress layer (greater than 700 MPa) with a certain depth, so that in the second step, a lower temperature and a short time are required, usually between 380° C. and 400° C., and the time is 2 h~4 h. The main reason for not selecting a longer time is that the tempering period is too long, the efficiency and yield are low, and the cost is high and it is not suitable for mass production.

The reinforced glass obtained by reinforcing the lithium-zirconium-based aluminosilicate glass by the above-mentioned method has a bending strength greater than 700 MPa, and can withstand a falling ball with energy greater than 0.4 J, which can effectively avoid or reduce the breakage of the glass of the screen or other cover plate of smart devices such as mobile phones due to accidentally falling on the ground. Thereby, it can be used as protective glass for mobile phones, tablets, or other mobile smart devices.

The display device according to an embodiment includes the above-mentioned lithium-zirconium-based aluminosilicate glass or the above-mentioned reinforced glass or the reinforced glass prepared by the above-mentioned method for preparing the reinforced glass. The display device includes smart mobile devices, digital cameras, etc. The above-mentioned lithium-zirconium-based aluminosilicate glass or the reinforced glass has high strength and can be used as a protective glass to prevent smart mobile devices from being damaged due to accidental falling.

The following are specific examples.

The preparation process of the lithium-zirconium-based aluminosilicate glass of Examples 1 to 21 is specifically as follows.

According to the compositions (mass percentages) of Example 1 to Example 21 in the following Table 1 to Table 3, the ingredients were fully and uniformly mixed, then melted in a platinum crucible at 1650° C. for 8 h under stirring with a platinum stirring paddle. After the stirring paddle was drawn out, the melt was cooled down to 1500° C., and kept for 1 h for homogenization. Then the melt was cast onto an iron mold to form a glass block with a size of about 80 mm×160 mm. The mold was preheated to 450° C. before casting, and the glass block was transferred to an annealing furnace for annealing (under a temperature of 590° C.) immediately after hardening, kept for 2 h, then cooled down to 140° C. for 6 h, and then cooled naturally, to obtain a lithium-zirconium-based aluminosilicate glass.

The reinforcement process of the lithium-zirconium-based aluminosilicate glass of Examples 1 to 7 is specifically as follows.

The lithium-zirconium-based aluminosilicate glasses obtained in the above Examples 1 to 7 were processed into 50 mm×50 mm×0.7 mm double side polished glass sheets. The glass sheets were tempered in a mixed melt of $NaNO_3$:$KNO_3$=1:1 (mass ratio) at 395° C. for 4 h, and then transferred into a mixed melt of $NaNO_3$:$KNO_3$=8:92 (mass ratio) at 380° C. for tempering for 2 h, to obtain reinforced glasses.

The reinforcement process of the lithium-zirconium-based aluminosilicate glass of Examples 8 to 14 is specifically as follows.

The lithium-zirconium-based aluminosilicate glasses obtained in the above Examples 8 to 14 were processed into 50 mm×50 mm×0.7 mm double side polished glass sheets. The glass sheets were tempered in a mixed melt of $NaNO_3$:$KNO_3$=8:2 (mass ratio) at 420° C. for 2 h, and then transferred into a mixed melt of $NaNO_3$:$KNO_3$=15:85 (mass ratio) at 400° C. for tempering for 2 h, to obtain reinforced glasses.

The reinforcement process of the lithium-zirconium-based aluminosilicate glass of Examples 15 to 21 is specifically as follows.

The lithium-zirconium-based aluminosilicate glasses obtained in the above Examples 15 to 21 were processed into 50 mm×50 mm×0.7 mm double side polished glass sheets. The glass sheets were tempered in a mixed melt of $NaNO_3$:$KNO_3$=2:8 (mass ratio) at 405° C. for 6 h, and then transferred into a mixed melt of $NaNO_3$:$KNO_3$=0.1:99.9 (mass ratio) at 390° C. for tempering for 4 h, to obtain reinforced glasses.

The preparation process of the lithium-zirconium-based aluminosilicate glass of Comparative Examples 1 to 13 is similar to the preparation process of the lithium-zirconium-based aluminosilicate glass of Examples 1 to 21, except that the compositions of the raw materials are as shown in Tables 4 to 5.

The reinforcement process of the lithium-zirconium-based aluminosilicate glass of Comparative Examples 1 to 10 is similar to the reinforcement process of the lithium-zirconium-based aluminosilicate glass of Examples 1 to 7, and will not be repeated herein.

The reinforcement process of the lithium-zirconium-based aluminosilicate glass of Comparative Example 11 is specifically as follows.

The lithium-zirconium-based aluminosilicate glass obtained in the above Comparative Example 11 was processed into a 50 mm×50 mm×0.7 mm double side polished glass sheet. The glass sheet was tempered in a mixed melt of $NaNO_3$:$KNO_3$=1:1 (mass ratio) at 395° C. for 6 h, to obtain a reinforced glass.

The reinforcement process of the lithium-zirconium-based aluminosilicate glass of Comparative Example 12 is specifically as follows.

The lithium-zirconium-based aluminosilicate glass obtained in the above Comparative Example 12 was processed into a 50 mm×50 mm×0.7 mm double side polished glass sheet. The glass sheet was tempered in a mixed melt of $NaNO_3$:$KNO_3$=8:92 (mass ratio) at 380° C. for 6 h, to obtain a reinforced glass.

The reinforcement process of the lithium-zirconium-based aluminosilicate glass of Comparative Example 13 is specifically as follows.

The lithium-zirconium-based aluminosilicate glass obtained in the above Comparative Example 13 was processed into a 50 mm×50 mm×0.7 mm double side polished glass sheet. The glass sheet was tempered in a mixed melt of $NaNO_3$:$KNO_3$=8:92 (mass ratio) at 395° C. for 4 h, and then transferred into a mixed melt of $NaNO_3$:$KNO_3$=1:1 (mass ratio) at 380° C. for tempering for 2 h, to obtain a reinforced glass.

Testing:

The lithium-zirconium-based aluminosilicate glasses obtained in the above-mentioned Examples 1 to 21 and Comparative Examples 1 to 13 were all processed into glass samples of (p 5 mm×50 mm. The thermal expansion curves were measured by using a NETZSCH Thermal Dilatometer (NETZSCH-DIL 402 PC) at a heating rate of 4° C./min. The strain point temperatures $T_g$, the expansion softening point temperatures $T_s$, and the coefficients of thermal expansion CTE of the glass samples in the range of 20° C.~300° C. were measured through the built-in software, and recorded in the Tables 1 to 5.

250 g of each of the lithium-zirconium-based aluminosilicate glasses obtained in Examples 1 to 21 and Comparative Examples 1 to 13 was taken to measure the high-temperature viscosity by using a glass high-temperature viscometer (ORTON, RSV-1600). The temperature at which the viscosity was 102 dPa·S was defined as the glass melting temperature $T_2$, and the temperatures at which the viscosities were 103 dPa·S, 104 dPa·S, and 105 dPa·S were defined as $T_3$, $T_4$, and $T_5$, respectively, and their values were correspondingly recorded in Tables 1 to 5.

For the reinforced glass, the stress tester FSM6000UV and SLP1000 (ORIHARA, Japan) were used to measure the surface stress value CS0, the compressive stress value CS10 at the depth of 10 μm, the compressive stress value CS30 at the depth of 30 μm and the compressive stress value CS100 at the depth of 100 μm, the maximum stress layer depth Dol0, and the stress layer depth Dol600 at 600 MPa, and results were recorded in Tables 1 to 5.

The lithium-zirconium-based aluminosilicate glass of Examples 1 to 21 and Comparative Examples 1 to 10 were cut into 70 mm×140 mm×0.7 mm glass sheets by an STX-1203 wire cutting machine (Shenyang, Kejing). The glass sheets were thinned and polished by an HD-640-5L double side grinding and polishing machine (Shenzhen, Hyde), and then edged by computer numerical control (CNC). After cleaning, they were tempered in a mixed melt of $NaNO_3$:$KNO_3$=1:1 (mass ratio) at 395° C. for 4 h, and then transferred to a mixed melt of $NaNO_3$:$KNO_3$=8:92 (mass ratio) at 380° C. for tempering for 2 h, to obtain reinforced glass substrates. The four-point bending strength was measured by PT-307A universal tester (Precise Test) and the energy of the falling ball withstood at the center of the glass substrate was measured by PT-706 falling ball tester. A 64 g of solid steel ball was used to hit the center, and if the center point did not break after three times of hits, then the height H mm was recorded. The falling ball energy was calculated by C=64×H/10000 (in a unit of J), and recorded in Tables 1 to 5.

The lithium-zirconium-based aluminosilicate glass of Comparative Examples 11 to 13 were cut into 70 mm×140 mm×0.7 mm glass sheets by the STX-1203 wire cutting machine (Shenyang, Kejing). The glass sheets were thinned and polished by the HD-640-5L double side grinding and polishing machine (Shenzhen, Hyde), and then edged by CNC. After cleaning, they were reinforced according to the above-mentioned reinforcement process of Comparative Examples 11 to 13, to obtain reinforced glass substrates. The four-point bending strength was measured by PT-307A universal tester (Precise Test) and the energy of the falling ball withstood at the center of the glass substrate was measured by PT-706 falling ball tester. A 64 g of solid steel ball was used to hit the center, and if the center point did not break after three times of hits, then the height H mm was recorded. The falling ball energy was calculated by C=64×H/10000 (in a unit of J), and recorded in Table 5.

The lithium-zirconium-based aluminosilicate glass of Examples 1 to 7 in Table 1 includes by mass percentage: 50%~72% of $SiO_2$, 10%~27% of $Al_2O_3$, 0.1%~10.0% of $B_2O_3$, 2%~10% of $Li_2O$, 4%~ 15% of $Na_2O$, 0.10%~5.0% of $ZrO_2$, 0~4% of $K_2O$, 0~6% of MgO, 0~4% of CaO, 0~4% of SrO, 0~4% of ZnO, 0~2% of $TiO_2$, 0~1% of $SnO_2$, and 0~0.5% of $CeO_2$. Wherein the total mass percentage of $Li_2O$, $Na_2O$, and $K_2O$ is greater than or equal to 9%, the total mass percentage of $ZrO_2$ and $Al_2O_2$ is greater than 10%, and the ratio of the mass of $Li_2O$ to the total mass of $Li_2O$, $Na_2O$, and $K_2O$ is (0.22~0.48):1.

Regarding the lithium-zirconium-based aluminosilicate glass obtained in the Examples 1 to 7, it is found that the lithium-zirconium-based aluminosilicate glass with the above composition characteristics has a coefficient of thermal expansion of $84.5\times10^{-7}$~$94.9\times10^{-7}$ at 20° C.~300° C., a melting temperature $T_2$ of 1543° C.~1638° C., and a glass transition point temperature $T_g$ of 497° C.~586° C. The lithium-zirconium-based aluminosilicate glass of Examples 1 to 7 was tempered in the mixed melt of $NaNO_3$:$KNO_3$=1:1 (mass ratio) at 395° C. for 4 h, and then transferred to the mixed melt of $NaNO_3$:$KNO_3$=8:92 (mass ratio) at 380° C. for tempering for 2 h, to obtain reinforced glass. The obtained reinforced glass has a surface compressive stress CS0 of greater than 800 MPa, a compressive stress CS10 of still more than 230 MPa at a depth of 10 μm from the glass surface, and a compressive stress CS30 of more than 140 MPa at a depth of 30 μm from the surface, and a stress depth Dol0 of greater than 136 μm when the composite compressive stress produced by ion exchange drops to 0 MPa (the detection limit of the instrument). The reinforced glass has a bending strength of greater than 740 MPa, and can withstand a falling ball energy of greater than 0.32 J.

Preferred ratios of the compositions of the lithium-zirconium-based aluminosilicate glass are listed in Table 2. The lithium-zirconium-based aluminosilicate glass of Examples 8 to 14 includes by mass percentage: 55%~67% of $SiO_2$, 13%~25% of $Al_2O_3$, 0.5%~4% of $B_2O_3$, 3%~7% of $Li_2O$, 6%~12% of $Na_2O$, 1%~4% of $ZrO_2$, 0~3% of $K_2O$, 0~4% of MgO, 0~2% of CaO, 0~2% of SrO, 0~2% of ZnO, 0~1% of $TiO_2$, 0~0.5% of $SnO_2$, and 0~0.5% of $CeO_2$. Wherein the total mass percentage of $Li_2O$, $Na_2O$, and $K_2O$ is greater than or equal to 9%, the total mass percentage of $ZrO_2$ and $Al_2O_3$ is greater than 16%, and the ratio of the mass of $Li_2O$ to the total mass of $Li_2O$, $Na_2O$, and $K_2O$ is (0.27~0.41):1.

Regarding the lithium-zirconium-based aluminosilicate glass obtained in the Examples 8 to 14, it is found that the lithium-zirconium-based aluminosilicate glass with the above composition characteristics has a coefficient of thermal expansion of $84.3\times10^{-7}$~$91.4\times10^{-7}$ at 20° C.~300° C., a melting temperature $T_2$ of 1581° C.~1613° C., and a glass transition point temperature $T_g$ of 503° C.~558° C. The lithium-zirconium-based aluminosilicate glass of Examples 8 to 14 was tempered in the mixed melt of $NaNO_3$:$KNO_3$=8:2 (mass ratio) at 420° C. for 2 h, and then

TABLE 1

Composition and performance data of the lithium-zirconium-based aluminosilicate glass of Examples 1 to 7

| Composition (%) | Example 1 | Example 2 | Example 3 | Example 4 | Example 5 | Example 6 | Example 7 |
|---|---|---|---|---|---|---|---|
| $SiO_2$ | 50.00 | 54.00 | 58.00 | 59.00 | 63.00 | 72.00 | 62.00 |
| $Al_2O_3$ | 27.00 | 18.00 | 22.00 | 18.00 | 14.00 | 12.00 | 10.00 |
| $B_2O_3$ | 0.10 | 0.50 | 1.50 | 2.50 | 10.00 | 1.00 | 2.50 |
| $Li_2O$ | 2.00 | 6.00 | 3.50 | 6.00 | 4.00 | 6.00 | 10.00 |
| $Na_2O$ | 7.00 | 8.50 | 6.00 | 7.00 | 4.00 | 6.00 | 15.00 |
| $K_2O$ | — | — | 1.00 | 1.50 | 4.00 | 0.50 | 0.40 |
| MgO | 6.00 | 5.00 | 1.00 | 1.00 | — | 1.00 | — |
| CaO | — | 4.00 | — | — | — | — | — |
| SrO | — | — | 4.00 | — | — | — | — |
| ZnO | — | — | — | 4.00 | — | — | — |
| $ZrO_2$ | 5.00 | 4.00 | 3.00 | 1.00 | 1.00 | 0.50 | 0.10 |
| $TiO_2$ | 2.00 | — | — | — | — | — | — |
| $SnO_2$ | 0.40 | — | — | — | — | 1.00 | — |
| $CeO_2$ | 0.50 | — | — | — | — | — | — |
| $Li_2O + Na_2O + K_2O$ | 9 | 14.5 | 10.5 | 14.5 | 12 | 12.5 | 25.4 |
| $Li_2O/(Li_2O + Na_2O + K_2O)$ | 0.22 | 0.41 | 0.33 | 0.41 | 0.33 | 0.48 | 0.39 |
| $Al_2O_3 + ZrO_2$ | 32 | 22 | 25 | 19 | 15 | 12.5 | 10.1 |
| Coefficient of thermal expansion CTE (20° C.~300° C., $\times10^{-7}$) | 94.9 | 91.2 | 86.1 | 89.3 | 90.1 | 84.5 | 90.8 |
| Glass transition point temperature $T_g$ (° C.) | 586 | 562 | 532 | 512 | 504 | 536 | 497 |
| Expansion softening point temperature $T_s$ (° C.) | 638 | 613 | 594 | 574 | 559 | 598 | 544 |
| $T_2$ (η viscosity, logη = 2, ° C.) | 1638 | 1611 | 1594 | 1572 | 1567 | 1597 | 1543 |
| $T_3$ (η viscosity, logη = 3, ° C.) | 1386 | 1326 | 1318 | 1282 | 1268 | 1320 | 1219 |
| $T_4$ (η viscosity, logη = 4, ° C.) | 1189 | 1138 | 1122 | 1083 | 1069 | 1129 | 1022 |
| $T_5$ (η viscosity, logη = 5, ° C.) | 1065 | 1009 | 983 | 966 | 954 | 994 | 921 |
| CS0(MPa) | 1074 | 878 | 1004 | 965 | 816 | 869 | 835 |
| CS10(MPa) | 362 | 254 | 345 | 317 | 229 | 242 | 234 |
| CS30(MPa) | 212 | 152 | 202 | 185 | 141 | 149 | 143 |
| CS100(MPa) | 98 | 59 | 93 | 84 | 55 | 61 | 60 |
| Dol0(μm) | 192 | 142 | 186 | 165 | 126 | 138 | 136 |
| Dol600(μm) | 7.8 | 5.5 | 7 | 6.3 | 5.1 | 5.4 | 5.3 |
| Bending strength (MPa) | 864 | 789 | 885 | 846 | 743 | 823 | 762 |
| Impact energy withstanding (J) | 0.512 | 0.384 | 0.544 | 0.480 | 0.320 | 0.448 | 0.384 |

Note that: CS0 is a surface stress value; CS10 is a compressive stress value at a depth of 10 μm; CS30 is a compressive stress value at a depth of 30 μm; CS100 is a compressive stress value at a depth of 100 μm; Dol0 is a maximum stress layer depth; and D0l600 is a stress layer depth at 600 MPa.

transferred to the mixed melt of $NaNO_3$:$KNO_3$=15:85 (mass ratio) at 400° C. for tempering for 2 h, to obtain reinforced glass. The obtained reinforced glass has a surface compressive stress CS0 of greater than 900 MPa, a compressive stress CS10 of still more than 275 MPa at a depth of 10 μm from the glass surface, and a compressive stress CS30 of more than 145 MPa at a depth of 30 μm from the surface, and a stress depth Dol0 of greater than 145 μm when the composite compressive stress produced by ion exchange drops to 0 MPa (the detection limit of the instrument). The reinforced glass has a bending strength of greater than 810 MPa, and can withstand a falling ball energy of greater than 0.48 J.

TABLE 2

Composition and performance data of the lithium-zirconium-based aluminosilicate glass of Examples 8 to 14

| Composition | Example 8 | Example 9 | Example 10 | Example 11 | Example 12 | Example 13 | Example 14 |
| --- | --- | --- | --- | --- | --- | --- | --- |
| $SiO_2$ | 55 | 57 | 59 | 59 | 63 | 65 | 67 |
| $Al_2O_3$ | 25 | 23 | 21 | 19 | 17 | 15 | 13 |
| $B_2O_3$ | 2 | 4 | 2 | 1 | 1 | 0.5 | 3 |
| $Li_2O$ | 4 | 3 | 5 | 5 | 3 | 7 | 5 |
| $Na_2O$ | 8 | 8 | 12 | 9.5 | 6 | 10 | 9 |
| $K_2O$ | 3 | — | — | 0.5 | — | — | — |
| MgO | — | — | — | — | 4 | — | — |
| CaO | — | — | — | — | 2 | — | — |
| SrO | — | — | — | 2 | — | — | — |
| ZnO | — | 2 | — | — | — | — | — |
| $ZrO_2$ | 3 | 2 | 1 | 3.5 | 4 | 1.5 | 3 |
| $TiO_2$ | — | 1 | — | — | — | — | — |
| $SnO_2$ | — | — | — | — | — | 0.5 | — |
| $CeO_2$ | — | — | — | 0.5 | — | 0.5 | — |
| $Li_2O + Na_2O + K_2O$ | 15 | 11 | 17 | 15 | 9 | 17 | 14 |
| $Li_2O/(Li_2O + Na_2O + K_2O)$ | 0.27 | 0.27 | 0.29 | 0.33 | 0.33 | 0.41 | 0.36 |
| $Al_2O_3 + ZrO_2$ | 28 | 25 | 22 | 22.5 | 21 | 16.5 | 16 |
| Coefficient of thermal expansion CTE (20° C.~300° C., $\times 10^{-7}$) | 91.4 | 90.2 | 90.8 | 88.7 | 84.3 | 86.4 | 84.8 |
| Glass transition point temperahire $T_g$ (° C.) | 558 | 539 | 512 | 521 | 536 | 514 | 503 |
| Expansion softening point temperature $T_s$ (° C.) | 614 | 601 | 575 | 579 | 594 | 572 | 559 |
| $T_2$ (η viscosity, logη = 2, ° C.) | 1613 | 1602 | 1592 | 1597 | 1599 | 1588 | 1581 |
| $T_3$ (η viscosity, logη = 3, ° C.) | 1338 | 1306 | 1288 | 1292 | 1312 | 1283 | 1279 |
| $T_4$ (η viscosity, logη = 4, ° C.) | 1154 | 1120 | 1103 | 1118 | 1129 | 1097 | 1086 |
| $T_5$ (η viscosity, logη = 5, ° C.) | 1029 | 998 | 979 | 997 | 1007 | 995 | 960 |
| CS0(MPa) | 1018 | 914 | 974 | 982 | 908 | 958 | 942 |
| CS10(MPa) | 359 | 288 | 331 | 336 | 275 | 314 | 304 |
| CS30(MPa) | 184 | 158 | 195 | 198 | 146 | 175 | 162 |
| CS100(MPa) | 90 | 69 | 86 | 88 | 65 | 79 | 78 |
| Dol0(μm) | 189 | 148 | 164 | 172 | 146 | 167 | 165 |
| Dol600(μm) | 6.7 | 5.2 | 6.2 | 6.4 | 5.6 | 6.1 | 5.9 |
| Bending strength (MPa) | 889 | 835 | 892 | 904 | 816 | 838 | 845 |
| Impact energy withstanding (J) | 0.544 | 0.512 | 0.480 | 0.512 | 0.480 | 0.480 | 0.480 |

More preferred ratios of the compositions of the lithium-zirconium-based aluminosilicate glass are listed in Table 3. The lithium-zirconium-based aluminosilicate glass of Examples 15 to 21 includes by mass percentage: 58%~64% of $SiO_2$, 16%~22% of $Al_2O_3$, 1%~2% of $B_2O_3$, 4%~6% of $Li_2O$, 8%~10% of $Na_2O$, 3%~4% of $ZrO_2$, 0~2% of $K_2O$, 0~2% of MgO, 0~2% of ZnO, 0~0.5% of $SnO_2$, and 0~0.5% of $CeO_2$. Wherein the total mass percentage of $Li_2O$, $Na_2O$, and $K_2O$ is greater than or equal to 9%, the total mass percentage of $ZrO_2$ and $Al_2O_3$ is greater than 19.50%, and the ratio of the mass of $Li_2O$ to the total mass of $Li_2O$, $Na_2O$, and $K_2O$ is (0.29~0.38):1.

Regarding the lithium-zirconium-based aluminosilicate glass obtained in the Examples 15 to 21, it is found that the lithium-zirconium-based aluminosilicate glass with the above composition characteristics has a coefficient of thermal expansion of $82.9\times10^{-7}$ at 20° S~300° C., a melting temperature $T_2$ of 1586° C.~1612° C., and a glass transition point temperature $T_g$ of 5050° C.~546° C. The lithium-zirconium-based aluminosilicate glass of Examples 15 to 21 was tempered in the mixed melt of $NaNO_3$:$KNO_3$=2:8 (mass ratio) at 405° C. for 6 h, and then transferred to the mixed melt of $NaNO_3$:$KNO_3$=08199.9 (mass ratio) at 390° C. for tempering for 4 h, to obtain reinforced glass. The obtained reinforced glass has a surface compressive stress CS0 of greater than 915 MPa, a compressive stress CS10 of more than still 300 MPa at a depth of 10 μm from the glass surface, and a compressive stress CS30 of more than 160 MPa at a depth of 30 μm from the surface, and a stress depth Dol0 of greater than 150 μm when the composite compressive stress produced by ion exchange drops to 0 MPa (the detection limit of the instrument). The reinforced glass has a bending strength of greater than 820 MPa, and can withstand a falling ball energy of greater than 0.48 J.

TABLE 3

Composition and performance data of the lithium-zirconium-based aluminosilicate glass of Examples 15 to 21

| Composition (%) | Example 15 | Example 16 | Example 17 | Example 18 | Example 19 | Example 20 | Example 21 |
|---|---|---|---|---|---|---|---|
| $SiO_2$ | 58 | 59.5 | 60 | 61 | 61.5 | 64 | 63 |
| $Al_2O_3$ | 21 | 20.5 | 20 | 18 | 22 | 16 | 16 |
| $B_2O_3$ | 2 | 2 | 1 | 1.5 | 1 | 1.5 | 1.5 |
| $Li_2O$ | 5.5 | 4 | 6 | 4.5 | 4 | 5 | 5 |
| $Na_2O$ | 10 | 10 | 8 | 8 | 8 | 9 | 9 |
| $K_2O$ | — | — | 2 | | | | |
| MgO | — | — | — | 2 | — | — | — |
| CaO | — | — | — | — | — | — | — |
| SrO | — | — | — | — | — | — | — |
| ZnO | — | — | — | — | — | | 2 |
| $ZrO_2$ | 3.5 | 4 | 3 | 3 | 3.5 | 4 | 3.5 |
| $TiO_2$ | — | — | — | 1 | — | — | — |
| $SnO_2$ | — | — | — | 0.5 | — | — | — |
| $CeO_2$ | — | — | — | 0.5 | — | 0.5 | — |
| $Li_2O + Na_2O + K_2O$ | 15.5 | 14 | 16 | 12.5 | 12 | 14 | 14 |
| $Li_2O/(Li_2O + Na_2O + K_2O)$ | 0.35 | 0.29 | 0.38 | 0.36 | 0.33 | 0.36 | 0.36 |
| $Al_2O_3 + ZrO_2$ | 24.5 | 24.5 | 23 | 21 | 25.5 | 20 | 19.5 |
| Coefficient of thermal expansion CTE (20° C.~300° C., $\times 10^{-7}$) | 89.8 | 88.9 | 88.1 | 86.5 | 82.9 | 83.6 | 84.4 |
| Glass transition point temperature $T_g$ (° C.) | 511 | 505 | 506 | 521 | 546 | 506 | 519 |
| Expansion softening point temperature $T_s$ (° C.) | 576 | 564 | 562 | 582 | 608 | 568 | 587 |
| $T_2$ (η viscosity, logη = 2, ° C.) | 1597 | 1587 | 1586 | 1589 | 1612 | 1589 | 1603 |
| $T_3$ (η viscosity, logη = 3, ° C.) | 1306 | 1293 | 1294 | 1288 | 1334 | 1295 | 1311 |
| $T_4$ (η viscosity, logη = 4, ° C.) | 1117 | 1098 | 1093 | 1094 | 1146 | 1099 | 1124 |
| $T_5$ (η viscosity, logη = 5, ° C.) | 981 | 976 | 964 | 959 | 1022 | 964 | 996 |
| CS0(MPa) | 982 | 969 | 1024 | 954 | 1066 | 918 | 922 |
| CS10(MPa) | 335 | 328 | 364 | 318 | 392 | 302 | 304 |
| CS30(MPa) | 192 | 189 | 206 | 178 | 235 | 165 | 164 |
| CS100(MPa) | 85 | 82 | 85 | 80 | 92 | 78 | 80 |
| Dol0(μm) | 162 | 158 | 174 | 154 | 164 | 183 | 182 |
| Dol600(μm) | 6.3 | 6.2 | 6.8 | 6.1 | 6.3 | 7.2 | 7.2 |
| Bending strength (MPa) | 854 | 843 | 896 | 885 | 914 | 827 | 844 |
| Impact energy withstanding (J) | 0.544 | 0.512 | 0.544 | 0.512 | 0.544 | 0.480 | 0.512 |

Composition and performance data of the lithium-zirconium-based aluminosilicate glass of Comparative Examples 1 to 7 are shown in Table 4 below. It can be seen from Table 4 that the total content of alkali metals in Comparative Example 1 is less than 9%, and its $T_2$ melting temperature is as high as 1652° C., at which mass production cannot be realized in actual glass furnaces, especially float furnaces. Generally, the melting temperature $T_2$ is required to be controlled below 1640° C. Such a high melting temperature will result in increase of the energy consumption of natural gas, electric energy, etc., on one hand. On the other hand, it will result in reduction of the life of the furnaces, refractory bricks, and related equipment, and increase of costs. It is also very difficult to control during forming stage.

In Comparative Example 2, 0% $Li_2O$ is contained, which results in only a small amount of Na—K exchange in the first tempering, and Li—Na exchange cannot be formed to form a high-stress layer depth. Therefore, its Dol0 (μm) is 34.8 μm, CS30 (MPa) is 24 MPa, and CS100 (MPa) is 0 MPa. Thereby, its bending strength is 608 MPa, and it can withstand a falling ball energy of 0.24 J, which are much lower than Li-containing aluminosilicate glass.

In Comparative Example 3, no $Na_2O$ is contained, and since $Li_2O/(Li_2O+Na_2O+K_2O)$ is 0.9, the number of moles of $Li_2O$ is greatly increased, and the mole content is close to 20%, which leads to a sharp decrease in the melting temperature of the glass, and it is difficult to control the float forming. And due to the increase of $Li_2O$ content, a devitrification phenomenon occurs in the glass. The occurrence of turbidity leads to the decrease of transmittance, the bending strength and the falling ball energy withstanding are reduced.

In Comparative Example 4, the content of $Li_2O$ is 2.90%, the content of $Na_2O$ is 10.10%, and $Li_2O/(Li_2O+Na_2O+K_2O)$ is 0.2, which is less than 0.22. As a result, Dol0 is 98 μm after the glass is chemically tempered by the two-step tempering method, which is much lower than the embodiment of the present disclosure. Its final bending strength and the falling ball energy withstanding both are reduced, and the falling ball energy withstanding is reduced to 0.24 J.

In Comparative Example 5, the content of $Li_2O$ is 6.60%, the content of $K_2O$ is 1.40%, and $Li_2O/(Li_2O+Na_2O+K_2O)$ is 0.55, which is greater than 0.48. After glass tempering, CS0 (MPa) is 668 MPa, which is less than 700 MPa, which will result in the reduction of the bending strength and falling ball strength of the glass. And a small amount of devitrification occurs in the glass body, which causes its bending strength to be reduced, and the falling ball energy withstanding to be reduced to 0.200 J.

In Comparative Example 6, the content of $Al_2O_3$ is 9.00, which is less than 100; the content of $Al_2O_3+ZrO_2$ is 9.50%, which is less than 10%; and the content of $B_2O_3$ is 4.00%. Decreasing the content of $Al_2O_3+ZrO_2$, especially $Al_2O_3$, will seriously affect the glass structure. $Al_2O_3$ participates in the structure as a glass intermediate, if its content is too low, the tempering performance of the glass body, especially the Na—K exchange in the second step, will decrease. As a result, the stress layer and the depth of the stress layer on the glass surface are reduced, and its strength, especially the bending strength and the falling ball strength are reduced.

In Comparative Example 7, no $ZrO_2$ is contained, and the content of $Al_2O_3$ is 10.10. Compared with Example 7, since there is no $ZrO_2$ filled in the gap of the glass structure, a sufficiently stable glass structure space cannot be formed. When it is impacted by an external force, there is no large field strength ion $Zr^{4+}$ in the gap of the structure to offset part of the external stress. As a result, it is easy to produce stress concentration, leading to a break of the glass products, and a reduction of the bending strength and the falling ball energy withstanding of the glass.

In Comparative Example 9, no $B_2O_3$ is contained, and the content of $SiO_2$ is 54.50%. Compared with Example 2, the stress value and stress depth after tempering are slightly improved, but since no boron oxide, mainly boron-oxygen triangle and boron-oxygen tetrahedron, is participated in the glass network structure, when the glass is subjected to an external impact, there is no buffer structure to offset this part of the stress, which is likely to cause stress concentration, resulting in a decrease in various strength properties. It can be clearly seen from Comparative Example 9 that the tempering performance is increased, but the bending strength and impact energy withstanding of the glass are reduced.

TABLE 4

Composition and performance data of the lithium-zirconium-based aluminosilicate glass of Comparative Examples 1 to 7

| Composition (%) | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| $SiO_2$ | 51.00 | 54.00 | 58.00 | 59.00 | 63.00 | 72.00 | 62.00 |
| $Al_2O_3$ | 27.00 | 18.00 | 22.00 | 18.00 | 14.00 | 9.00 | 10.10 |
| $B_2O_3$ | 0.10 | 0.50 | 1.50 | 2.50 | 10.00 | 4.00 | 2.50 |
| $Li_2O$ | 2.00 | — | 9.50 | 2.90 | 6.60 | 6.00 | 10.00 |
| $Na_2O$ | 6.00 | 14.50 | — | 10.10 | 4.00 | 6.00 | 15.00 |
| $K_2O$ | — | — | 1.00 | 1.50 | 1.40 | 0.50 | 0.40 |
| MgO | 6.00 | 5.00 | 1.00 | 1.00 | — | 1.00 | — |
| CaO | — | 4.00 | — | — | — | — | — |
| SrO | — | — | 4.00 | — | — | — | — |
| ZnO | — | — | — | 4.00 | — | — | — |
| $ZrO_2$ | 5.00 | 4.00 | 3.00 | 1.00 | 1.00 | 0.50 | — |
| $TiO_2$ | 2.00 | — | — | — | — | — | — |
| $SnO_2$ | 0.40 | — | — | — | — | 1.00 | — |
| $CeO_2$ | 0.50 | — | — | — | — | — | — |
| $Li_2O + Na_2O + K_2O$ | 8 | 14.5 | 10.5 | 14.5 | 12 | 12.5 | 25.4 |
| $Li_2O/(Li_2O + Na_2O + K_2O)$ | 0.25 | 0 | 0.90 | 0.2 | 0.55 | 0.48 | 0.39 |
| $Al_2O_3 + ZrO_2$ | 32 | 22 | 25 | 19 | 15 | 9.5 | 10.1 |
| Coefficient of thermal expansion CTE (20° C.~300° C., $\times 10^{-7}$) | 92.4 | 89.4 | 95.6 | 84.2 | 92.4 | 83.2 | 90.8 |
| Glass transition point temperature $T_g$ (° C.) | 604 | 568 | 508 | 529 | 498 | 514 | 497 |
| Expansion softening point temperature $T_s$ (° C.) | 662 | 619 | 552 | 589 | 536 | 553 | 544 |
| $T_2$ (η viscosity, logη = 2. ° C.) | 1652 | 1623 | 1483 | 1592 | 1545 | 1562 | 1543 |
| $T_3$ (η viscosity, logη = 3, ° C.) | 1403 | 1357 | 1108 | 1294 | 1228 | 1256 | 1219 |
| $T_4$ (η viscosity, logη = 4, ° C.) | 1220 | 1152 | 926 | 1103 | 1032 | 1079 | 1022 |
| T5 (η viscosity, logη = 5, ° C.) | 1104 | 1036 | 867 | 989 | 924 | 942 | 921 |
| CS0(MPa) | 1086 | 989 | 788 | 976 | 668 | 726 | 819 |
| CS10(MPa) | 358 | 645 | 189 | 212 | 179 | 184 | 203 |
| CS30(MPa) | 233 | 24 | 104 | 124 | 121 | 132 | 121 |
| CS100(MPa) | 102 | 0 | 45 | 64 | 52 | 61 | 62 |
| Dol0(μm) | 187 | 34.8 | 194 | 98 | 169 | 124 | 106 |
| Dol600(μm) | 7.8 | 11.2 | 3.2 | 5.9 | 4.8 | 3.4 | 4.8 |
| Bending strength (MPa) | 854 | 608 | 722 | 748 | 598 | 625 | 654 |
| Impact energy withstanding (J) | 0.512 | 0.240 | 0.200 | 0.240 | 0.200 | 0.240 | 0.280 |
| Devitrification or not | NO | NO | Devitrification | NO | Slight devitrification | NO | NO |

Composition and performance data of the lithium-zirconium-based aluminosilicate glass of Comparative Examples 8 to 13 are listed in Table 5 below. It can be seen from Table 5 that in Comparative Example 8, 1% of $P_2O_5$ is contained, and the content of $Al_2O_3$ is 26%. Compared with Example 1, after tempering, the compressive stress value is reduced, the depth of the stress layer is slightly increased, and the tensile stress value at the center of the glass is increased, leading to a certain degree of reduction for both the bending strength and the impact energy of falling ball withstood of the glass.

In Comparative Example 10, 0.10% $Fe_2O_3$ is contained, and the content of $SiO_2$ is 57.90%. Compared with Example 3, the thermal performance and glass melting difficulty are almost the same, and the stress value and stress depth after two-step tempering are basically the same. And the bending strength and the falling ball energy withstanding are slightly reduced, but the color is obviously yellow, which is not conducive to the application in the display cover industries, so it should be avoided as much as possible.

In the reinforcement step of Comparative Example 11, only the first step of reinforcement is carried out. Compared with Example 4, since Na—K ion exchange and a large amount of Li—K ion exchange could not be carried out during the tempering process, only Li— Na exchange and a small amount of Li—K exchange exist on the surface, and the stress value of the glass surface is only 386 MPa. Since the second exchange is not carried out, the total stress depth Dol0 (μm) is also 20 μm-30 μm lower than that of Example 4, resulting in the bending strength of the glass being only 524 MPa, and the falling ball energy withstanding being less than 0.2 J.

In the reinforcement step of Comparative Example 12, only the second step of reinforcement is carried out. Compared with Example 5, since Li—Na ion exchange could not be carried out during the tempering process, only Li—K and Na—K exchanges are carried out, the glass surface has higher compressive stress value, but the stress depth is only about 5.4 μm, its CS10, CS30, and CS100 are all 0, and Dol0 (μm) is only 5.4 μm, which is much lower than the average level of more than 100 microns in the secondary reinforcement, resulting in the bending strength being only 489 MPa, and the falling ball energy withstanding being less than 0.2 J.

In the reinforcement step of Comparative Example 13, the ratio of sodium nitrate and potassium nitrate is not within the range required herein. As a result, the Li—Na exchange and part of the Na—K and Li—K exchanges in the first step of tempering during the tempering process are not optimal, and the main Na—K ion exchange in the second step of tempering is also at a relatively low level, and its various tempering data are far lower than those of Example 6, which directly leads to a great reduction in its bending strength and falling ball energy withstanding.

TABLE 5

Composition and performance data of the lithium-zirconium-based aluminosilicate glass of Comparative Examples 8 to 13

| Composition (%) | Comparative Example 8 | Comparative Example 9 | Comparative Example 10 | Comparative Example 11 | Comparative Example 12 | Comparative Example 13 |
|---|---|---|---|---|---|---|
| $SiO_2$ | 50.00 | 54.50 | 57.90 | 59.00 | 63.00 | 72.00 |
| $Al_2O_3$ | 26.00 | 18.00 | 22.00 | 18.00 | 14.00 | 12.00 |
| $B_2O_3$ | 0.10 | — | 1.50 | 2.50 | 10.00 | 1.00 |
| $Li_2O$ | 2.00 | 6.00 | 3.50 | 6.00 | 4.00 | 6.00 |
| $Na_2O$ | 7.00 | 8.50 | 6.00 | 7.00 | 4.00 | 6.00 |
| $K_2O$ | — | — | 1.00 | 1.50 | 4.00 | 0.50 |
| MgO | 6.00 | 5.00 | 1.00 | 1.00 | — | 1.00 |
| CaO | — | 4.00 | — | — | — | — |
| SrO | — | — | 4.00 | — | — | — |
| ZnO | — | — | — | 4.00 | — | — |
| $ZrO_2$ | 5.00 | 4.00 | 3.00 | 1.00 | 1.00 | 0.50 |
| $TiO_2$ | 2.00 | — | — | — | — | — |
| $SnO_2$ | 0.40 | — | — | — | — | 1.00 |
| $CeO_2$ | 0.50 | — | — | — | — | — |
| $P_2O_5$ | 1.00 | — | — | — | — | — |
| $Fe_2O_3$ | — | — | 0.10 | — | — | — |
| $Li_2O + Na_2O + K_2O$ | 9 | 14.5 | 10.5 | 14.5 | 12 | 12.5 |
| $Li_2O/(Li_2O + Na_2O + K_2O)$ | 0.22 | 0.41 | 0.33 | 0.41 | 0.33 | 0.48 |
| $Al_2O_3 + ZrO_2$ | 32 | 22 | 25 | 19 | 15 | 12.5 |
| Coefficient of thermal expansion CTE (20° C.~300° C., $\times10^{-7}$) | 95.3 | 91.2 | 85.6 | 89.3 | 90.1 | 84.5 |
| Glass transition point temperature $T_g$ (° C.) | 582 | 567 | 534 | 512 | 504 | 536 |
| Expansion softening point temperature $T_s$ (° C.) | 630 | 618 | 593 | 574 | 559 | 598 |
| $T_2$ (η viscosity, logη = 2, ° C.) | 1632 | 1615 | 1592 | 1572 | 1567 | 1597 |
| $T_3$ (η viscosity, logη = 3, ° C.) | 1374 | 1333 | 1322 | 1282 | 1268 | 1320 |
| $T_4$ (η viscosity, logη = 4, ° C.) | 1171 | 1149 | 1125 | 1083 | 1069 | 1129 |
| $T_5$ (η viscosity, logη = 5, ° C.) | 1052 | 1033 | 988 | 966 | 954 | 994 |
| CS0(MPa) | 934 | 914 | 998 | 386 | 865 | 643 |
| CS10(MPa) | 291 | 262 | 334 | 225 | 0 | 134 |
| CS30(MPa) | 145 | 158 | 205 | 148 | 0 | 92 |
| CS100(MPa) | 89 | 64 | 96 | 79 | 0 | 32 |
| Dol0(μm) | 204 | 154 | 187 | 135 | 5.4 | 85 |
| Dol600(μm) | 8.2 | 5.8 | 6.9 | 0 | 1.8 | 4.2 |
| Bending strength (MPa) | 758 | 682 | 843 | 524 | 489 | 624 |
| Impact energy withstanding (J) | 0.320 | 0.320 | 0.480 | <0.200 | <0.200 | 0.240 |
| Color of glass | White | White | Yellow | White | White | White |

It can be seen from the above experimental results that the reinforced glasses obtained by subjecting the lithium-zirconium-based aluminosilicate glasses prepared in Examples 1 to 21 to a two-step reinforcement treatment have a surface compressive stress CS0 greater than 800 MPa, a compressive stress CS10 still exceeding 230 MPa at a depth of 10 μm from the glass surface, a compressive stress CS30 exceeding 140 MPa at a depth of 30 μm from the surface, and a stress depth Dol0 greater than 150 μm when the composite compressive stress produced by ion exchange drops to 0 MPa (the detection limit of the instrument). And the reinforced glasses have a bending strength of greater than 700 MPa, and can withstand a falling ball energy greater than 0.4 J.

Each of the technical features of the above-mentioned embodiments may be combined arbitrarily. To simplify the description, not all the possible combinations of each of the technical features in the above embodiments are described. However, all of the combinations of these technical features should be considered as within the scope of this disclosure, as long as such combinations do not contradict with each other.

The above-mentioned embodiments are merely illustrative of several embodiments of the present disclosure, which are described specifically and in detail, but it cannot be understood to limit the scope of the present disclosure. It should be noted that, for those ordinary skilled in the art, several variations and improvements may be made without departing from the concept of the present disclosure, and all of which are within the protection scope of the present disclosure. Therefore, the protection scope of the present disclosure shall be defined by the appended claims.

What is claimed is:

1. A lithium-zirconium-based aluminosilicate glass comprising the following components by mass percentage:

50%-72% of $SiO_2$;
13%-27% of $Al_2O_3$;
0.1%-10.0% of $B_2O_3$;
2%-10% of $Li_2O$;
4%-15% of $Na_2O$;
0.1%-5.0% of $ZrO_2$; and
0~4% of $K_2O$, and at least one of the following:

$SnO_2$ having a mass percentage greater than 0 but no greater than 1%,
$CeO_2$ having a mass percentage greater than 0 but no greater than 0.5%, or
SrO having a mass percentage greater than 0 but no greater than 4%; and wherein a total mass percentage of $Li_2O$, $Na_2O$, and $K_2O$ is no less than 9%, wherein a total mass percentage of $ZrO_2$ and $Al_2O_3$ is greater than 16%, wherein a ratio of a mass of $Li_2O$ to a total mass of $Li_2O$. $Na_2O$, and $K_2O$ is (0.27-0.41): 1; and wherein the lithium-zirconium-based aluminosilicate glass does not comprise CaO.

2. The lithium-zirconium-based aluminosilicate glass of claim 1, wherein the total mass percentage of $Li_2O$, $Na_2O$, and $K_2O$ is no less than 12%, the total mass percentage of $ZrO_2$ and $Al_2O_3$ is greater than 19.5%, and the ratio of the mass of $Li_2O$ to the total mass of $Li_2O$, $Na_2O$, and $K_2O$ is (0.29~0.38):1.

3. The lithium-zirconium-based aluminosilicate glass of claim 1, wherein $ZrO_2$ has a mass percentage of 1%-4%, and $Al_2O_3$ has a mass percentage of 13%-25%.

4. The lithium-zirconium-based aluminosilicate glass of claim 3, wherein $ZrO_2$ has the mass percentage of 3%-4%, and $Al_2O_3$ has the mass percentage of 16%-22%.

5. The lithium-zirconium-based aluminosilicate glass of claim 1, wherein $Li_2O$ has a mass percentage of 3%-7%, $Na_2O$ has a mass percentage of 6%-12%, and $K_2O$ has a mass percentage of 0-3%.

6. The lithium-zirconium-based aluminosilicate glass of claim 5, wherein $Li_2O$ has the mass percentage of 4%~6%, $Na_2O$ has the mass percentage of 8%-10%, and $K_2O$ has the mass percentage of 0-~2%.

7. The lithium-zirconium-based aluminosilicate glass of claim 1, wherein the lithium-zirconium-based aluminosilicate glass comprises by mass percentage: 55%-67% of $SiO_2$, 13%-25% of $Al_2O_3$, 0.5%-4% of $B_2O_3$, 3%-7% of $Li_2O$, 6%-12% of $Na_2O$, 1%-4% of $ZrO_2$, and 0-3% of $K_2O$, wherein a total mass percentage of $ZrO_2$ and $Al_2O_3$ is greater than 16%, and the ratio of the mass of $Li_2O$ to the total mass of $Li_2O$, $Na_2O$, and $K_2O$ is (0.27-0.41):1.

8. The lithium-zirconium-based aluminosilicate glass of claim 7, wherein the lithium-zirconium-based aluminosilicate glass comprises by mass percentage: 58%-64% of $SiO_2$, 16%-22% of $Al_2O_3$, 1%-2% of $B_2O_3$, 4%-6% of $Li_2O$, 8%-10% of $Na_2O$, 3%-4% of $ZrO_2$, and 0-2% of $K_2O$, wherein the total mass percentage of $Li_2O$, $Na_2O$, and $K_2O$ is no less than 12%, the total mass percentage of $ZrO_2$ and $Al_2O_3$ is greater than 19.5%, and the ratio of the mass of $Li_2O$ to the total mass of $Li_2O$, $Na_2O$, and $K_2O$ is (0.29-0.38):1.

9. The lithium-zirconium-based aluminosilicate glass of claim 1, wherein a molar amount of $Li_2O$ is higher than molar amount of $Na_2O$.

10. The lithium-zirconium-based aluminosilicate glass of claim 1, wherein the lithium-zirconium-based aluminosilicate glass further comprises MgO with a mass percentage of no greater than 2%.

11. The lithium-zirconium-based aluminosilicate glass of claim 1, wherein the lithium-zirconium-based aluminosilicate glass further comprises at least one of MgO with a mass percentage of no greater than 4%, ZnO with a mass percentage of no greater than 2%, $TiO_2$ with a mass percentage of no greater than 1%, $SnO_2$ with a mass percentage of no greater than 0.5%, and $CeO_2$ with a mass percentage of no greater than 0.5%.

12. The lithium-zirconium-based aluminosilicate glass of claim 1, wherein the lithium-zirconium-based aluminosilicate glass has a coefficient of thermal expansion of $84.5\times10^{-7}$ to $94.9\times10^{-7}$ at 20° C. to 300° C., a melting temperature $T_2$ of 1543° C. to 1638° C., and a glass transition temperature Tg of 497° C. to 586° C.

13. A reinforced glass obtained from the lithium-zirconium-based aluminosilicate glass of claim 1 by chemical reinforcement.

14. The reinforced glass of claim 13, wherein the reinforced glass has a bending strength greater than 700 MPa, and a falling ball energy withstanding exceeding 0.4 J.

15. The lithium-zirconium-based aluminosilicate glass of claim 13, having a depth of a stress layer greater than 130 μm.

16. A display device comprising the lithium-zirconium-based aluminosilicate glass of claim 1.

17. A lithium-zirconium-based aluminosilicate glass comprising the following components by mass percentage:

50%-72% of $SiO_2$;
10%-27% of $Al_2O_3$;
0.1%-10.0% of $B_2O_3$;
2%-10% of $Li_2O$;
4%-15% of $Na_2O$;
0.1%-5.0% of $ZrO_2$; and
0-4% of $K_2O$; and wherein a total mass percentage of $Li_2O$, $Na_2O$, and $K_2O$ is no less than 9%, a ratio of a mass of $Li_2O$ to a total mass of $Li_2O$, $Na_2O$, and $K_2O$ is (0.27-0.41): 1, and the lithium-zirconium-based aluminosilicate glass omits CaO.

* * * * *